Figure 1:
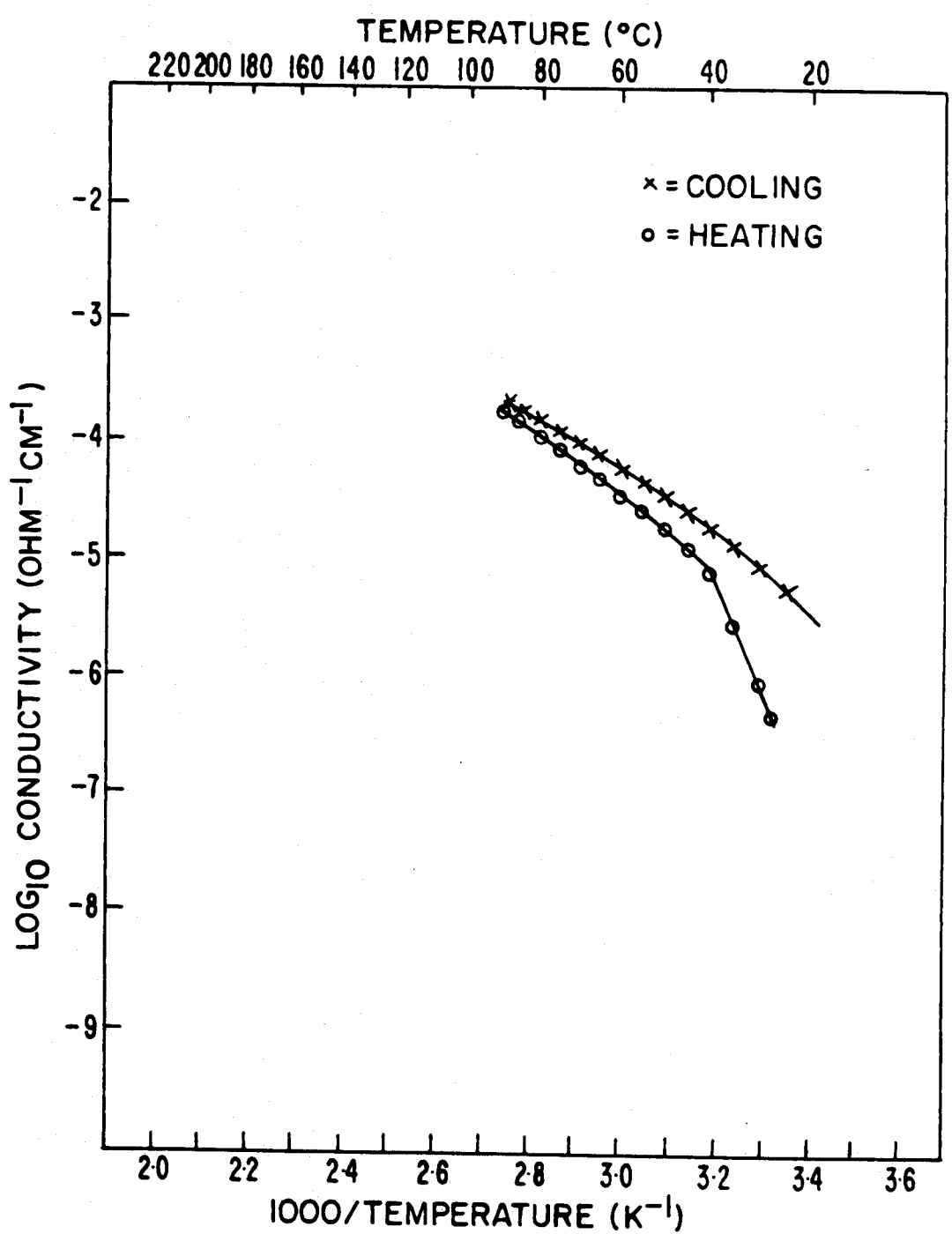

United States Patent [19]

Kronfli et al.

[11] Patent Number: 5,009,970

[45] Date of Patent: Apr. 23, 1991

[54] POLYMER ELECTROLYTES

[75] Inventors: Esam Kronfli; Keith V. Lovell, both of Swindon; Alan Hooper, Faringdon; Robin J. Neat, Marston, all of United Kingdom

[73] Assignee: United Kingdom Atomic Energy Authority, London, United Kingdom

[21] Appl. No.: 223,648

[22] Filed: Jul. 25, 1988

[30] Foreign Application Priority Data

Jul. 28, 1987 [GB] United Kingdom ............... 8717799

[51] Int. Cl.$^5$ .............................. C08J 3/28; C08K 3/24; C08L 71/02; H01M 6/18
[52] U.S. Cl. .................................... 429/192; 522/83; 522/86; 522/166
[58] Field of Search .................... 522/166, 86; 429/192

[56] References Cited

U.S. PATENT DOCUMENTS

| | | | |
|---|---|---|---|
| 2,964,455 | 12/1960 | Graham | 522/166 |
| 3,429,794 | 2/1969 | Patterson | 522/166 |
| 3,470,078 | 9/1969 | King | 522/166 |
| 4,556,614 | 12/1985 | le Mehaute et al. | 429/191 |

FOREIGN PATENT DOCUMENTS

0078505A1  5/1983  European Pat. Off. .
2143539A   2/1985  United Kingdom .

*Primary Examiner*—Marion E. McCamish
*Assistant Examiner*—Arthur H. Koeckert
*Attorney, Agent, or Firm*—Larson and Taylor

[57] ABSTRACT

A solid polymer electrolyte is in the form of a gel comprising a complex of a solid polymer (e.g. poly(ethene oxide) and an alkali metal salt (e.g. LiClO$_4$), the polymer being cross-linked to inhibit its transformation from an amorphous form to a crystalline form thereby to improve the alkali metal ion conductivity of the electrolyte at lower temperatures. The electrolyte may be made by irradiating (e.g. by gamma radiation or an electron beam) a solution, preferably aqueous, of the complex to cause the polymer to cross-link and form a gel. The electrolyte may be used as a component in a solid state electrochemical cell (e.g. for a rechargeable lithium battery), where the gel form of the electrolyte assists fabrication.

2 Claims, 2 Drawing Sheets

POLYMER ELECTROLYTES

This invention relates to polymer electrolytes suitable for use in solid state electrochemical cells.

A solid state electrochemical cell for use in a secondary battery and comprising a Li or Li-based anode, a lithium ion-conducting polymeric electrolyte, and a cathode based on an insertion electrode material such as $V_6O_{13}$, $V_2O_5$ and $TiS_2$ is known and is described in, for example European Patent Application Publication No 0 013 199 (corresponding to U.S. Pat. No 4 303 748) and UK Patent Specification No 2 139 410A (corresponding to U.S. Pat. No 4 547 440). An insertion electrode material is a material capable of acting as a cathode in such a cell by virtue of its ability to allow certain ions to be physically inserted into its structure during discharging of the cell and to be subsequently removed therefrom during charging thereof. Thus, the overall cell reaction when the electrode material is $V_6O_{13}$ is as follows:

$$xLi^+ + xe^- + V_6O_{13} \rightarrow Li_xV_6O_{13}$$

for x in the range 0 to 8.

It is also known from the above-mentioned publications that the cathode may be constructed as a composite structure comprising the insertion electrode material, polymer electrolyte material and, if required, an electronically conducting medium such as graphite. This is to achieve high active cathode utilisations at realistic current densities.

Examples of the polymeric electrolyte in the known cell are complexes of macromolecular materials such as poly(ethene oxide), commonly known as poly(ethylene oxide), and referred to herein as PEO, with a lithium salt, the anion of which may, for example be $I^-$, $Br^-$, $ClO_4^-$, $SCN^-$ or $F_3CSO_3^-$.

The above cells have the problem, however that, for high rate applications, they work satisfactorily at elevated temperatures only, e.g. 100° C. to 130° C. This is because the polymer in the polymer electrolyte changes from an amorphous form to a crystalline form as its temperature is lowered, the amorphous form being primarily responsible for its ability to conduct lithium ions. Hence, the ionic conductivity of the polymeric electrolyte is not high enough for the cell to operate satisfactorily at high rates at ambient or near ambient temperatures whereas the ionic conductivity is sufficient at elevated temperatures.

This invention is concerned with ameliorating the above problem by cross-linking the polymer in the electrolyte to inhibit its tendency to become crystalline as its temperature is lowered. Also, the polymer electrolyte is then in a form that facilitates its use in subsequent fabrication of a solid state electrochemical cell, and further, the ionic conductivity of the electrolyte at any temperature may be improved.

The invention includes, in a first aspect, a method of making a solid polymer electrolyte comprising irradiating a solution in a solvent of a polymer electrolyte comprising a complex of a polymer and an alkali metal salt, which polymer is capable of forming donor-acceptor type bonds with alkali metal ions and is capable of conducting alkali metal ions, the conditions of and type of irradiation and the solvent being such as to cause the polymer to cross-link and convert the solution into a gel thereby to inhibit transformation of the polymer from an amorphous form to a crystalline form.

It is highly preferred that the solution is an aqueous solution and that the gel is a hydrogel. It is, however, possible that solvents other than water may exist to enable irradiation to cause the polymer to cross-link and give rise to a gel.

In another aspect, the invention includes a solid polymer electrolyte in the form of a gel comprising a complex of a solid polymer and an alkali metal salt wherein the polymer is cross-linked to inhibit its transformation from an amorphous form to a crystalline form, which polymer is capable of forming donor-acceptor type bonds with alkali metal ions and is capable of conducting alkali metal ions.

Experiments to be described hereinafter have shown that the ionic conductivity of electrolytes of this invention does not fall sharply at lower temperatures (e.g. between 40° and 60° C.), indicating that the transition from the amorphous form of the polymer to its crystalline form has been suppressed.

The art describes irradiating polymer-salt complexes but not, as far as is known, in solution and not with such beneficial effects. Thus, GB-A-2 143 539 describes irradiating polymer-salt complexes under dry conditions; also the ionic conductivity figures given therein are inferior to those obtained for the electrolytes of the present invention. EP-A-0 078 505 describes irradiating a polymer-electrolyte film, after it has been cast, and in the presence of a co-polymer.

In the practice of the method of the present invention, the solution may be irradiated by any form of radiation and of such a dose as to cause the polymer to cross-link. Examples of kinds of irradiation that have been found useful are gamma-irradiation and electron beam irradiation. The latter has the advantage of providing a large amount of energy in a concentrated region and therefore reducing treatment times. Examples of radiation doses that have been used in the present method are doses of up to 10 Mrad, for example in the range from 1 Mrad to 9 Mrad. The dose may be optimised to achieve best ionic conductivity values.

Examples of polymers that may be used are those known in the art and such as referred to above, e.g. PEO. The molecular weight and the molecular weight distribution of the polymer may be significant in determining its usefulness in the practice of the invention. For example, it has been found that certain lower molecular weight forms of PEO, namely 200, 1000 and 10,000, did not form gels using the present method, whereas a higher molecular weight form, namely $2.0 \times 10^6$ did form gels. The above figures are average molecular weights, and it has been further found that the narrower the range of molecular weights of the PEO, the more successful is the practice of the invention.

The alkali metal salt is preferably a Li salt and the anion of the salt may be one of the above-mentioned anions such as $CF_3SO_3^-$ or $ClO_4^-$. There is evidence to show that the concentration of the salt and the particular anion thereof may influence the cross-linking behaviour of the polymer in the practice of the invention and hence the properties of the solid polymer electrolyte.

It is possible, but not firmly established, that the present method may be influenced by the presence of a cross-linking promoter.

The electrolyte of the invention may be fabricated into a solid-state electrochemical cell comprising an alkali metal (e.g. Li) or alkali metal-based anode, the electrolyte of the invention, and a cathode (e.g. based on an insertion electrode material), wherein the cathode may be a composite including the electrolyte of the invention. The cell may, for example, be made in the form of a sandwich arrangement of its components, for example by stacking, rolling or folding into the required configuration and then containing in a cell casing and providing terminals so that the cell can be used. The components may be in the form of thin films; the existence of the electrolyte of this invention in hydrogel form makes it easy and simple to convert it to a film and to contact the other cell components in cell fabrication.

Figure 2:
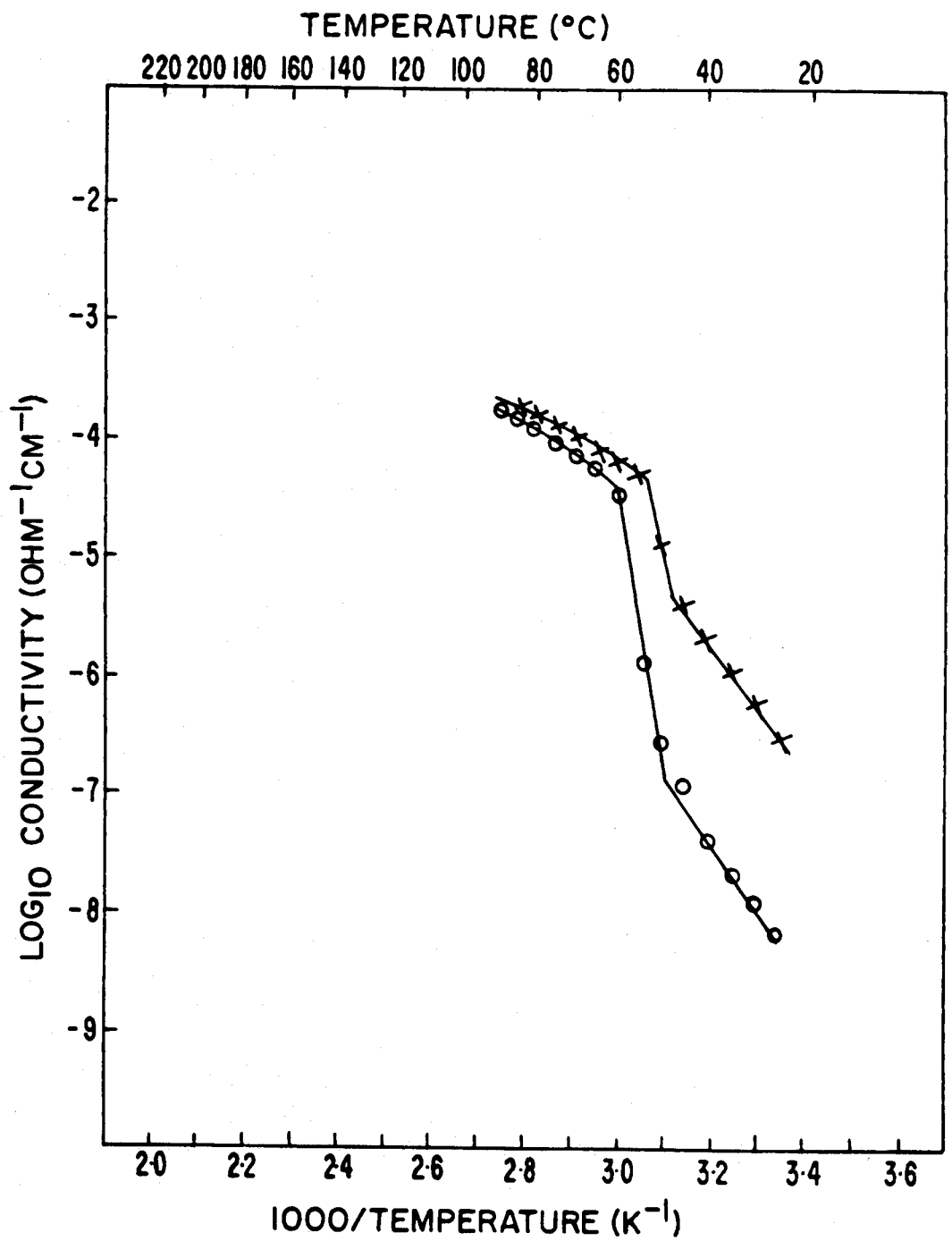

The invention will now be described in detail by way of example only. Comparison will be made with polymer electrolytes not falling within the scope of this invention. Also, reference will be made to the accompanying drawings, wherein FIG. 1 is a graph showing the relationship between the ionic conductivity of a polymer electrolyte of the invention and temperature; and FIG. 2 is a graph showing the same relationship for a comparison polymer electrolyte.

EXAMPLE 1

PEO (average molecular weight $2.0 \times 10^6$) and $LiCF_3SO_3$ were dissolved in water to give a 2.5% aqueous solution (weight/weight) of the complex $(PEO)_9LiCF_3SO_3$. Aliquots of the solution were placed in small plastic pots and exposed to gamma radiation at 25° C. in the presence of oxygen at a dose rate of 0.10 M rad/hour to a total dose of 6.0 M rad using a $Co^{60}$ source. This gave a hydrogel which was subsequently dried in a vacuum oven containing silica gel for a number of days.

The ionic conductivity of the resulting film was measured over a range of temperatures, both heating and cooling, using the standard complex impedance method using impedance data collected using a Solartron 1174 FRA.

COMPARATIVE EXAMPLE

PEO (20 g) was added slowly to a solution of lithium trifluoromethane sulphonate (8.0 g) in acetonitrile (800 ml) while stirring at high speed. When the PEO had dissolved, the solution was stabilised with poly(ethylene imine) (0.4 g) and cast onto release paper in film form using a doctor blade method. The resulting films, containing the complex $(PEO)_9LiCF_3SO_3$, were dried in a vacuum oven containing silica gel for 24 hours.

The films were then sandwiched between layers of release paper and placed in identical glass tubes. The tubes were then evacuated, placed in a constant temperature water bath at 78° C. and exposed to gamma radiation at a dose rate of 0.25 M rad/hour to a total dose of 6.0 M rad.

The resulting samples were tested as described in the above example of the invention.

RESULTS

These are shown in FIGS. 1 and 2 where values obtained when heating are shown by a circle and those obtained when cooling by a cross.

Referring to FIG. 1, it can be seen that there is no sharp change in ionic conductivity with temperature for the polymer electrolyte of the invention. In contrast, referring to FIG. 2, it can be seen that ionic conductivity of the comparison polymer electrolyte falls sharply (and activation energy increases sharply) within the temperature range 45° C. to 60° C.

It is postulated that, in the comparison polymer electrolyte, the polymer has recrystallised at 45°–40° C., whereas, in the polymer electrolyte of the invention, the gamma radiation has caused the polymer to gel thereby trapping it in its amorphous form.

EXAMPLE 2

An aqueous solution of $(PEO)_{20}LiClO_4$ was gamma irradiated to a dose of 6.4 M rad as described in Example 1. The PEO was as used in Example 1.

The ionic conductivities of the resulting films were measured as described in Example 1 and found to be similar to those of the films obtained in Example 1.

EXAMPLE 3

Aliquots of an aqueous solution of $(PEO)_{20}LiClO_4$ as used in Example 2 were placed in plastic trays and irradiated under an electron beam for a plurality of passes of the beam, each pass being the equivalent of 1.25 Mrad of gamma-irradiation and taking about 1 second.

Films of hydrogel similar to those obtained in Example 1 and with good mechanical properties were obtained for doses of 5.0 M rad (4 passes, about 4 seconds) and of 7,.5 M rad (6 passes, about 6 seconds). The ionic conductivities of the films were measured as described in Example 1 and found to be similar to those of the films obtained in Example 1.

We claim:

1. A method of making a solid polymer electrolyte suitable for use as the electrolyte of a solid-state electrochemical cell, comprising the steps of irradiating with gamma radiation or an electron beam an aqueous solution of a polymer electrolyte comprising a complex of a polymer and an alkali metal salt, the polymer comprising poly(ethene oxide), which polymer is capable of forming donor-acceptor type bonds with alkali metal ions, the conditions of irradiation being such as to cause the said polymer itself to cross-link and to form a hydrogel thereby to inhibit transformation of the polymer from an amorphous form to a crystalline form, and drying the hydrogel to form a solid polymer electrolyte with adequate electrical conductivity for use as the electrolyte of a solid-state electrochemical cell.

2. A method according to claim 1 wherein the alkali metal comprises lithium.

* * * * *